(12) United States Patent
Ge

(10) Patent No.: US 11,100,187 B2
(45) Date of Patent: Aug. 24, 2021

(54) METHOD AND DEVICE FOR JUMPING BETWEEN PAGES

(71) Applicant: ALIBABA GROUP HOLDING LIMITED, Grand Cayman (KY)

(72) Inventor: Yuangen Ge, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 402 days.

(21) Appl. No.: 16/139,183

(22) Filed: Sep. 24, 2018

(65) Prior Publication Data

US 2019/0026383 A1 Jan. 24, 2019

Related U.S. Application Data

(63) Continuation of application No. PCT/CN2017/076698, filed on Mar. 15, 2017.

(30) Foreign Application Priority Data

Mar. 25, 2016 (CN) .......................... 201610179092.3
Aug. 31, 2016 (CN) .......................... 201610797158.5

(51) Int. Cl.
  *G06F 16/957* (2019.01)
  *G06F 16/954* (2019.01)
  (Continued)

(52) U.S. Cl.
  CPC .......... *G06F 16/9574* (2019.01); *G06F 9/547* (2013.01); *G06F 16/2365* (2019.01);
  (Continued)

(58) Field of Classification Search
  CPC .............. G06F 16/9574; G06F 16/986; G06F 16/9535; G06F 16/2365; G06F 9/547;
  (Continued)

(56) References Cited

U.S. PATENT DOCUMENTS 6,334,145 B1 * 12/2001 Adams ................ G06F 16/9562
                                                              709/217
7,043,524 B2   5/2006 Shah et al.
(Continued)

FOREIGN PATENT DOCUMENTS

CN        101783903 A     7/2010
CN        103105994 A     5/2013
(Continued)

OTHER PUBLICATIONS

International Search Report and Written Opinion for Application No. PCT/CN2017/076698, dated Jun. 20, 2017, 9 pages.
(Continued)

*Primary Examiner* — Quoc A Tran

(57) ABSTRACT

A method and device for jumping between pages are provided. The method for jumping between pages is applied to an application (APP) client, and the APP client is associated with tree path information. The method includes: determining a target jump path for jumping from a current page to a target page; obtaining, based on the tree path information, valid jump paths for jumping from the current page; determining whether the target jump path exists in the valid jump paths, and if the target jump path exists in the valid jump paths, buffering page content of the current page to a stack, and jumping from the current page to the target page through the target jump path.

13 Claims, 4 Drawing Sheets

(51) Int. Cl.
*H04W 4/18* (2009.01)
*H04L 29/08* (2006.01)
*G06F 16/958* (2019.01)
*G06F 16/9535* (2019.01)
*G06F 16/23* (2019.01)
*G06F 9/54* (2006.01)
*G06F 3/0483* (2013.01)
*G06F 17/00* (2019.01)

(52) U.S. Cl.
CPC ........ *G06F 16/954* (2019.01); *G06F 16/9535* (2019.01); *G06F 16/986* (2019.01); *H04L 67/02* (2013.01); *H04L 67/04* (2013.01); *H04W 4/18* (2013.01); *G06F 3/0483* (2013.01); *G06F 16/972* (2019.01)

(58) Field of Classification Search
CPC .... G06F 16/954; G06F 3/0483; G06F 16/972; G06F 17/30902; G06F 17/30896; G06F 17/30873; G06F 17/30371; G06F 17/30867; H04W 4/18; H04L 67/04; H04L 67/02; G06G 3/0483
See application file for complete search history.

(56) References Cited

U.S. PATENT DOCUMENTS

| | | |
|---|---|---|
| 7,437,707 B2 | 10/2008 | Huerta et al. |
| 8,078,619 B2 | 12/2011 | Bansal et al. |
| 8,595,186 B1 | 11/2013 | Mandyam et al. |
| 8,725,888 B2 | 5/2014 | Short et al. |
| 8,812,804 B2 | 8/2014 | Goss et al. |
| 8,813,079 B1 | 8/2014 | Lindo et al. |
| 8,831,995 B2 | 9/2014 | Holler et al. |
| 9,092,526 B1 | 7/2015 | Khafizov et al. |
| 2002/0087883 A1 | 7/2002 | Wohlgemuth et al. |
| 2005/0171950 A1 | 8/2005 | Dumitru et al. |
| 2005/0204292 A1* | 9/2005 | Kibilov ................ G06F 16/955 715/738 |
| 2005/0246505 A1 | 11/2005 | Mckenney et al. |
| 2006/0123361 A1* | 6/2006 | Sorin .................... G06F 16/954 715/854 |
| 2008/0134205 A1 | 6/2008 | Bansal et al. |
| 2010/0250528 A1* | 9/2010 | Punera ................ G06F 16/957 707/726 |
| 2011/0010612 A1 | 1/2011 | Thorpe et al. |
| 2012/0036456 A1 | 2/2012 | Grunberger |
| 2013/0145108 A1 | 6/2013 | Lindo et al. |
| 2013/0262980 A1 | 10/2013 | Uyama |
| 2014/0129733 A1* | 5/2014 | Klais ...................... H04L 45/22 709/239 |
| 2014/0173482 A1* | 6/2014 | Hicks .................. G06F 3/04883 715/769 |
| 2014/0379839 A1 | 12/2014 | Dou |
| 2015/0254088 A1 | 9/2015 | Chou et al. |

FOREIGN PATENT DOCUMENTS

| | | |
|---|---|---|
| CN | 103123623 A | 5/2013 |
| CN | 103500204 A | 1/2014 |
| CN | 103678536 A | 3/2014 |
| CN | 104156232 A | 11/2014 |
| CN | 104182408 A | 12/2014 |
| CN | 104484479 A | 4/2015 |
| EP | 1517252 A1 | 3/2005 |
| JP | H11-167584 A | 6/1999 |
| JP | 2002-108932 A | 4/2002 |
| JP | 2005-149378 A | 6/2005 |
| JP | 2013-214165 A | 10/2013 |

OTHER PUBLICATIONS

Notice of Allowance for Japanese Application No. 2018-550370 dated Sep. 29, 2020.
First Search dated Apr. 21, 2020, issued in related Chinese Application No. 201610797158.5 (2 pages).
First Office Action dated Apr. 24, 2020, issued in related Chinese Application No. 201610797158.5, with English machine translation (21 pages).
Notification of Reasons for Refusal dated Apr. 21, 2020, issued in related Japanese Application No. 2018-550370, with English machine translation (6 pages).
Extended European Search Report for European Application No. 17769349.6 dated Sep. 25, 2019 (8 pages).
Chaudry et al., "Mobile Interface design for Low-Literacy Populations", Proceedings of the 2nd ACM SIGHIT Symposium on International Health Informatics, IHI '12, Jan. 28-30, 2012, pp. 91-100 (11 pages).
International Preliminary Report on Patentability Chapter I for PCT Application No. PCT/CN2017/076698 dated Oct. 4, 2018 (12 pages).

* cited by examiner

METHOD AND DEVICE FOR JUMPING BETWEEN PAGES

CROSS-REFERENCE TO RELATED APPLICATIONS

This application is a continuation application of International Patent Application No. PCT/CN2017/076698, filed on Mar. 15, 2017, which claims priority to Chinese Patent Application No. 201610179092.3, filed on Mar. 25, 2016, and entitled "METHOD AND DEVICE FOR JUMPING BETWEEN PAGES," and Chinese Patent Application No. 201610797158.5, filed on Aug. 31, 2016, and entitled "METHOD AND DEVICE FOR JUMPING BETWEEN PAGES." All of the above referenced applications are incorporated herein by reference in their entirety.

TECHNICAL FIELD

This application relates to network technologies, and in particular, to a method and device for jumping between pages.

BACKGROUND

With the development of the Internet, a mobile user can surf the Internet at any place anytime by using an application (APP) on a mobile phone. Because only one page (for example, a Hypertext Markup Language HTML 5 page is used) can be displayed on the APP, a new page can push a historical page into a page stack. When excessive pages are opened, the page stack is full, and the APP consumes a large amount of memory, resulting in collapse of the APP. In addition, after the user opens a plurality of pages, if the user needs to use a function of a previous page, the user needs to perform a return operation a plurality of times based on a backward sequence of the opened pages. Consequently, experience of surfing the Internet by the user of a mobile terminal is compromised.

SUMMARY

The present application provides a method and device for jumping between pages, to resolve a problem in the existing technology that when excessive pages are opened by using an APP, because the APP consumes an excessive amount of memory and return needs to be performed a plurality of times, a user may have poor experience of surfing the Internet through the APP. This application provides the following technical solutions for improving user experience in surfing the Internet.

A first aspect provides a method for jumping between pages. The method can be implemented an APP client on a computing device. The APP client is associated with tree path information. The method includes:

when a jump from a current page to a target page is needed, determining a target jump path for jumping to the target page;

obtaining, based on the tree path information, valid jump paths for jumping from the current page;

determining whether the target jump path is in the valid jump paths; and if the target jump path is in the valid jump paths, buffering page content of the current page to a top of a stack, and jumping from the current page to the target page through the target jump path.

A second aspect provides a method for returning from a page. The method can be implemented by an APP client. The APP client is associated with tree path information. According to one embodiment, the method includes:

when a current page needs to return to a historical page, determining a buffer page corresponding to content buffered in a top of a stack, and further determining a target return path for jumping to the buffer page;

obtaining valid return paths of the current page based on the tree path information;

determining whether the target return path exists in the valid return paths; and if the target return path exists in the valid return paths, returning to the buffer page through the target return path, and popping the buffer page from the stack.

A third aspect provides a device for jumping between pages. The device has an APP client installed thereon. The APP client is associated with tree path information. According to one embodiment, the device includes:

a first determining unit, configured to: when a jump from a current page to a target page is needed, determine a target jump path for jumping to the target page;

a first obtaining unit, configured to obtain, based on the tree path information, valid jump paths for jumping from the current page;

a first judging unit, configured to determine whether the target jump path exists in the valid jump paths; and a jumping unit, configured to: when the first judging unit determines that the target jump path exists in the valid jump paths, buffer page content of the current page to a top of a stack, and jump from the current page to the target page through the target jump path.

A fourth aspect provides a device for returning from a page. The device has an APP client installed thereon. The APP client is associated with tree path information. According to one embodiment, the device includes:

an obtaining unit, configured to: when a current page needs to return to a historical page, determine a buffer page corresponding to content buffered in a top of a stack, and further determine a target return path for jumping to the buffer page;

a determining unit, configured to obtain valid return paths of the current page based on the tree path information;

a judging unit, configured to determine whether the target return path exists in the valid return paths; and a return unit, configured to: when the judging unit determines that the target return path exists in the valid return paths, return to the buffer page through the target return path, and pop the buffer page from the stack.

The present disclosure further provides a computing device comprising a processor and a non-transitory computer-readable storage medium storing instructions associated with an application (APP) on the computing device. The instructions, when executed by the processor, cause the processor to perform a method jumping pages, the method comprising determining a target jump path for jumping from a current page to a target page, obtaining, based on tree path information associated with the APP, valid jump paths for jumping from the current page, determining whether the target jump path exists in the valid jump paths, and if the target jump path exists in the valid jump paths, buffering page content of the current page to a top of a stack, and jumping from the current page to the target page through the target jump path.

According to one embodiment, the method may further comprise steps of jumping from the target page to a historical page, for example, determining a buffer page corresponding to content buffered in a top of a stack, and further determining a target return path for jumping to the buffer page, obtaining valid return paths of the target page based on the tree path information, determining whether the target return path exists in the valid return paths, and if the target return path exists in the valid return paths, returning to the buffer page through the target return path.

According to another embodiment, the non-transitory computer-readable storage medium may further store instructions that, when executed by the processor, cause the processor to perform determining a buffer page corresponding to the content buffered in the top of the stack, and further determining a target return path for jumping to the buffer page, obtaining valid return paths of the current page based on the tree path information, determining whether the target return path exists in the valid return paths, and if the target return path exists in the valid return paths, returning to the buffer page through the target return path.

In this application, layers and a sequence of opening and returning pages are limited by controlling paths for opening the pages, to enable the pages to jump forward or return in sequence. This resolves a problem that the APP collapses because the APP consumes an excessive amount of memory when excessive pages are opened, and improves experience of a user when using a web browser plug-in.

It should be understood that the above general descriptions and the following detailed descriptions are merely for exemplary and explanatory purposes, and cannot limit this application.

DETAILED DESCRIPTION OF THE INVENTION

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of devices and methods that are described in detail in the appended claims and that are consistent with some aspects of this application.

Terms used in this application are only for describing specific embodiments, but not intended to limit this application. The terms "a", "said" and "the" of singular forms used in this application and the appended claims of this application are also intended to include plural forms, unless otherwise specified in the context clearly. It should also be understood that, the term "and/or" used herein indicates and includes any or all possible combinations of one or more associated listed items.

It should be understood that, the terms such as first, second, and third may be used in this application to describe various information, but the information is not limited to the terms. The terms are only used to distinguish a same type of information. For example, first information may alternatively be referred to as second information without departing from the scope of this application. Similarly, second information may alternatively be referred to as first information. A term depends on context. For example, the term "if" used herein may be constructed as "when" or "during" or "in response to a decision".

Figure 1:
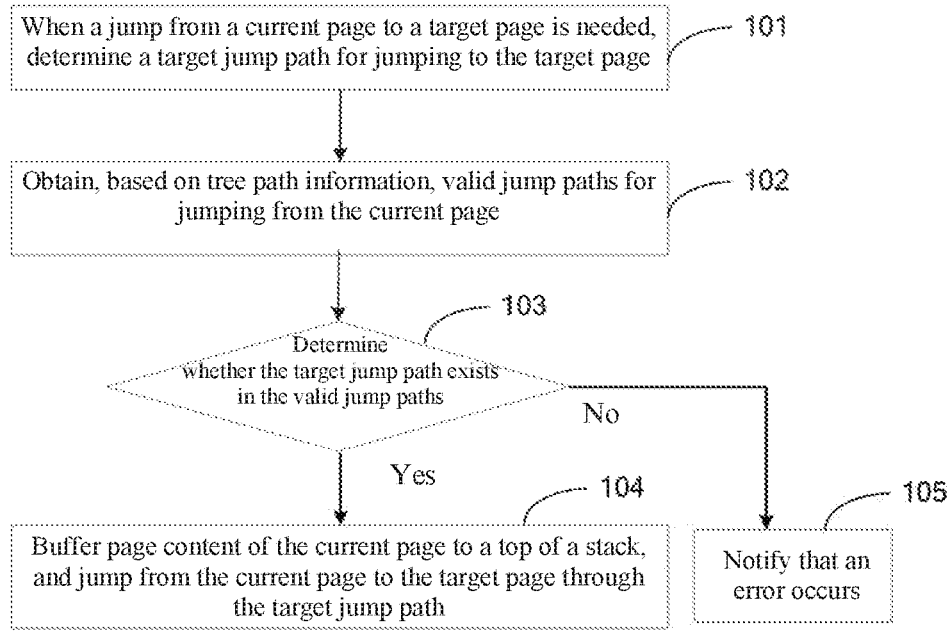
FIG. 1 is a flowchart of a method for jumping between pages according to an embodiment of this application.
Figure 2:
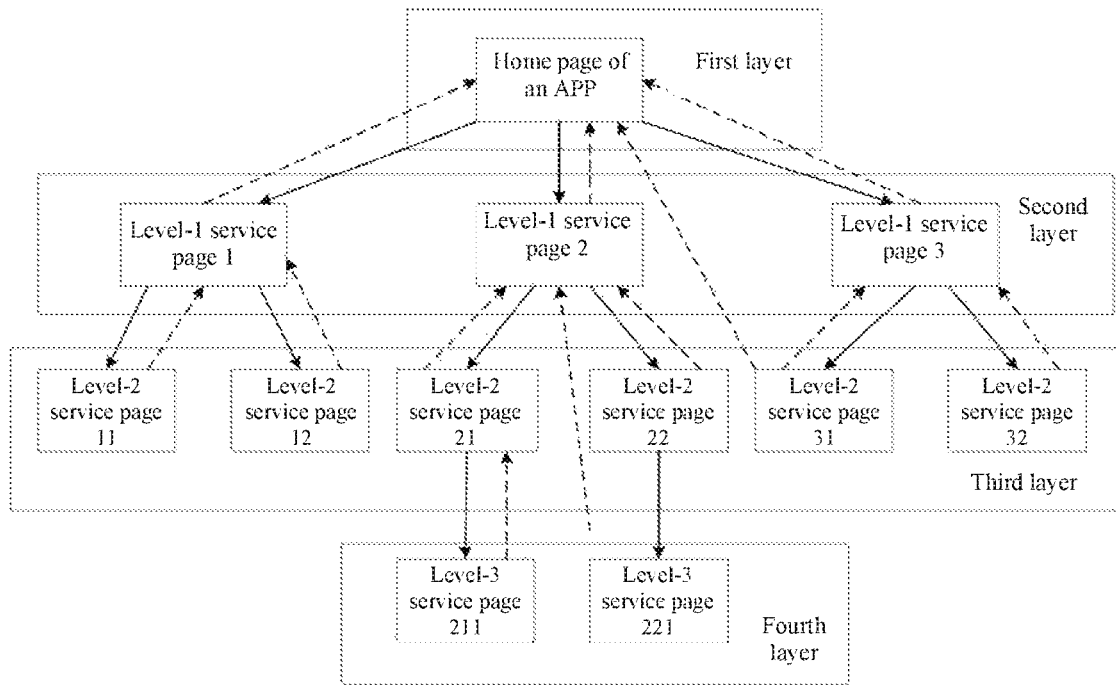
FIG. 2 is a schematic structural diagram of tree path information according to an embodiment of this application.

FIG. 1 is a flowchart of a method for jumping between pages according to an embodiment of this application. The method is applied to an APP client. The APP herein may be a web browser, or may be another APP (for example, WeChat) having a web browsing function. For the latter case, the web browsing function of the APP may be implemented by using a browser plug-in (for example, a plug-in supporting HTML 5). The APP client is associated with tree path information. The tree path information may be locally stored in the client device, or may be stored in a cloud. This is not limited in this embodiment. A schematic structural diagram of the tree path information is shown in FIG. 2. The method includes the following steps.

Step 101: When a jump from a current page to a target page is needed, determine a target jump path for jumping to the target page.

In the step, when a user surfs the Internet by using the APP client (for example, WeChat or a mobile phone browser), a jump from the current page to a next new page (namely, the target page, for example, a HTML 5 page) is needed. First, a browsing function module of the APP obtains the target jump path for jumping to the new page. Specific methods for obtaining the target jump path are known technology to a person skilled in the art, and details are not described herein. In this embodiment, a webview component may be embedded in the APP, to support HTML 5 page browsing.

Step 102: Obtain, based on the tree path information, valid jump paths for jumping from the current page. Information about the valid jump paths may be represented in a form such as a list. This is not limited in this embodiment. In the step, a method for obtaining the valid jump paths may include: querying the tree path information by using a bridged application interface (jsbridge api), to obtain the valid jump paths for jumping from the current page. The jsbridge api is a javascript application programming interface of the client that is exposed in a bridged manner, which is well known to a person skilled in the art.

The tree path information includes different levels of pages and jump paths between the pages. The pages include a home page, a plurality of level-1 service pages, a plurality of level-2 service pages, . . . and a plurality of level-N service pages. N is a natural number and is the same as a quantity of levels of page buffer, a jump between the different levels of pages may be performed through a path, and a jump between the home page and all other levels of pages may be performed through a path. That is, the home page is a root node, the level-1 service page is a subnode of the root node, the level-2 service page is a subnode of the level-1 service page, ..., and so on.

The tree path information may be information on page jumping represented by a tree structure. For example, a schematic diagram of a tree path having a simple 4-layer structure is shown below. As shown in FIG. 2:

a first layer includes a home page of an APP;

a second layer includes a level-1 service page 1, a level-1 service page 2, and a level-1 service page 3;

a third layer includes: a level-2 service page 11 and a level-2 service page 12 under the level-1 service page 1, a level-2 service page 21 and a level-2 service page 22 under the level-1 service page 2, a level-2 service page 31 and a level-2 service page 32 under the level-1 service page 3; and a fourth layer includes: a level-3 service page 211 under the level-2 service page 21 and a level-3 service page 221 under the level-2 service page 22.

In the figure, each node represents a page. A solid arrow represents a path indicating a forward direction of a page from which a jump is performed. The "forward direction" herein is a path through which a jump is performed from the root node to a leaf node (for example, a jump from the level-1 service page 1 to the level-2 service page 11 may be performed). A dashed arrow represents a path indicating a backward direction of a page from which a jump is performed. The "backward direction" herein is a path through which a jump is performed from the leaf node to a root node (for example, a jump from the level-2 service page 21 to the level-1 service page 2 may be performed). During actual application, both a forward path and a backward path may exist between two different levels of pages, or only a forward path may exist between two different levels of pages (for example, between the level-2 service page 21 and the level-3 service page 221), or only a backward path may exist between two different levels of pages (for example, between the level-3 service page 221 and the level-1 service page 2). It should be noted that, FIG. 2 in this embodiment is merely a schematic diagram, and during actual application, a tree diagram in a service may be simpler or more complex. This is not limited in this embodiment.

Next, the tree path structure shown in FIG. 2 is converted into a storable data structure. A node of the tree structure is used as a storage unit, to store a forward path and a backward path of each node. During actual storage, storage may be performed by using a format such as a JSON format (a lightweight data exchange format), an Extensible Markup Language (XML) format, or a relational data table. The following schematically describes a storage mechanism of a "home page of an APP", a "level-1 service page 1", and three nodes that are shown in FIG. 2 by using the JSON format as an example.

The home page of the APP:

```
{
type: root,
from: [ ],
to: [the level-1 service page 1, the level-1 service page 2,
and the level-1 service page 3]
},
the level-1 service page 1:
{
type: level-1, from: [the home page of the APP],
to: [the level-2 service page 11 and the level-2 service page 12]
},
```

In the schematic storage structure, a node of each page has three basic attributes: type, from, and to. Type is used to indicate a level of the node; from is used to indicate a backward path of the node, and the backward path corresponds to "a dashed arrow pointed out from the node" in FIG. 2 (namely, nodes to which the node can return, and which is null if no such node exists); and to is used to indicate a forward path of the node, and the forward path corresponds to "a solid arrow pointed out from the node" in FIG. 2 (namely, nodes to which the node can forward jump, and which is null if no such node exists).

The tree path structure in the foregoing steps is converted into a storable structure and is stored in the APP client of the mobile phone. The structure can be stored in a plurality of manners, for example, is stored in a local file in a JSON format or an XML format, or may be placed in a local storage provided by the HTML 5; data of the relational data table may be stored in a SQLite database, or may be stored in an Indexed DB (where a considerable quantity of structured data can be stored in the client) provided by the HTML 5. Details are no longer described in this embodiment.

Finally, the jsbridge api for querying the structure is provided api is the application interface.

Step 103: Determine whether the target jump path exists in the valid jump paths, and if the target jump path exists in the valid jump paths, perform step 104; or if the target jump path does not exist in the valid jump paths, perform step 105.

Step 104: Buffer page content of the current page to a top of a stack, and jump from the current page to the target page through the target jump path.

Step 105: Notify that an error occurs.

In the step, whether the valid jump paths obtained locally include the determined target jump path is determined, and if the valid jump paths obtained locally include the determined target jump path, the current page is placed in the page path buffer stack of pages, and a direct jump is performed to the target page based on the target jump path, or if the valid jump paths obtained locally do not include the determined target jump path, the user is notified of information about a jump error.

In this application, layers and a sequence of opening pages are limited by controlling paths for opening the pages, to enable the pages to jump forward in sequence. This resolves a problem that the APP collapses because the APP consumes an excessive amount of memory when excessive pages are opened. The solution in this application can be effectively applied to a browser or a browser plug-in (for example, a plug-in supporting the HTML 5) of another APP.

Optionally, in another embodiment, based on the foregoing embodiment, this embodiment may further include:

1) when a current page needs to return to a historical page, determining a buffer page corresponding to content buffered in a top of a stack, and further determining a target return path for jumping to the buffer page;

2) obtaining valid return paths of the current page based on the tree path information; and 3) determining whether the target return path exists in the valid return paths, and if the target return path exists in the valid return paths, returning to the historical page through the target return path, and popping the buffer page from the stack.

For a specific method for returning from a page, refer to the following embodiment. Details are not described in this embodiment temporarily.

In this application, layers and a sequence of returning from pages are limited by controlling paths for opening the pages, to enable the pages to return in sequence. This resolves a problem that the APP collapses because the APP consumes an excessive amount of memory when excessive pages are opened. The solution in this application can be effectively applied to a browser or a browser plug-in (for example, a plug-in supporting the HTML 5) of another APP.

Figure 3:
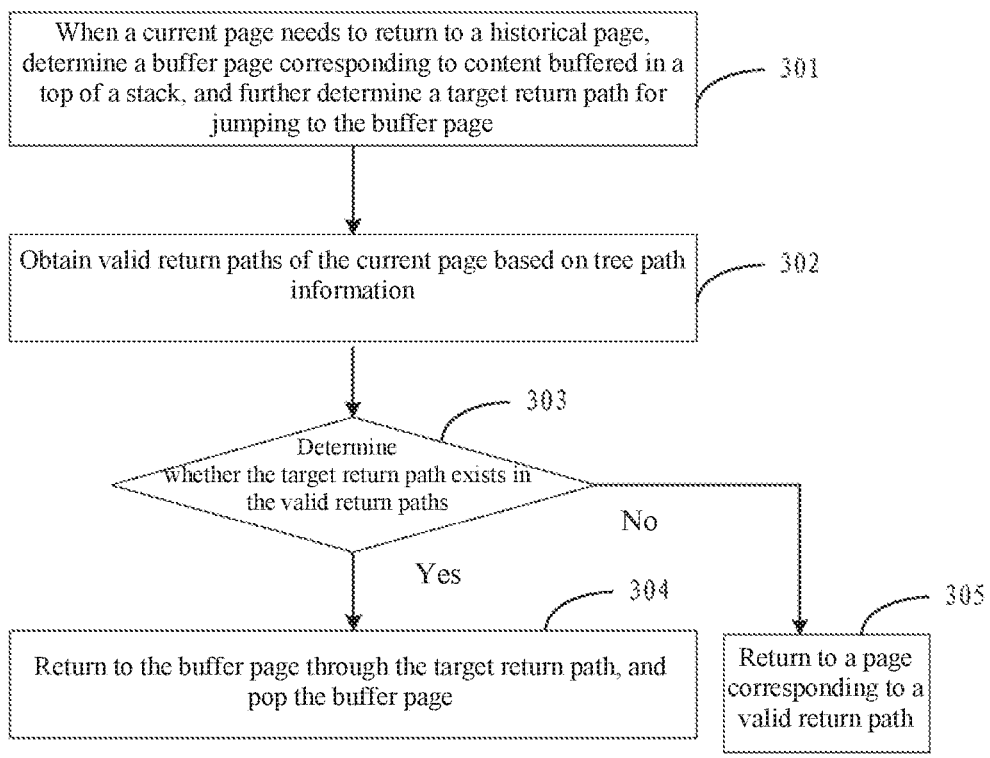
FIG. 3 is another flowchart of a method for jumping between pages according to an embodiment of this application.

FIG. 3 is a flowchart of a method for returning from a page according to an embodiment of this application. The method is applied to an application (APP) client. The APP client is associated with tree path information. A schematic structural diagram of the tree path information is shown in FIG. 2. The tree path information may be locally stored in the client device, or may be stored in a cloud. This is not limited in this example. Refer to the foregoing descriptions for details, and details are not described herein again. The method includes the following steps.

Step 301: When a current page needs to return to a historical page, determine a buffer page corresponding to content buffered in a top of a stack, and further determine a target return path for jumping to the buffer page.

Different from a common "jumping" operation between pages, page "return" is for the historical page of the current page instead of for a specific target page. That is, a jump to a "previous" page of the current page is performed. Based on the descriptions of the foregoing embodiments, the "previous" page is stored in a top of a stack. Based on this embodiment, when the current page needs to return to the historical page, the buffer page corresponding to the content buffered in the top of the stack is first determined, and a target return path for jumping to the buffer page is further determined. The buffer page is the historical page to be returned.

Step 302: Obtaining valid return paths of the current page based on the tree path information.

Information about the valid return paths may be marked in a form of a list, or certainly may be marked in another form. This is not limited in this embodiment.

In the step, a method for obtaining the valid return paths is: querying the tree path information by using a jsbridge api, to obtain the valid return paths for jumping from the current page.

Refer to the foregoing descriptions for details of a structure of the tree path information, and details are not described herein again.

Step 303: Determine whether the target return path exists in the valid return paths, and if the target return path exists in the valid return paths, perform step 304; or if the target return path does not exist in the valid return paths, perform step 305.

Step 304: Return to the historical page through the target return path, and pop the buffer page from the stack.

Step 305: Return to a page corresponding to a valid return path.

In steps 303 to 305, if a user needs to perform a return operation on the current page, for example, the user needs to perform the return operation after opening a page by scanning a two-dimensional barcode, the user may query a valid return path of the page (that is, a page corresponding to the from attribute) by using the jsbridge api, then determines whether a jump path (that is, the target return path) of the page corresponding to the top of the stack is among the valid return paths, and if the jump path exists in the valid return path, returns to the buffer page, i.e., the page of history, through the target return path, and pops the buffer page from the stack, or if the jump path does not exist in the valid return paths, returns to a page corresponding to a valid return path.

In this application, layers and a sequence of returning from pages are limited by controlling paths for opening the pages, to enable the pages to return backward in sequence. This resolves a problem that the APP collapses because the APP consumes an excessive amount of memory because excessive HTML 5 pages are opened. The solution in this application can be effectively applied to a browser or a browser plug-in (for example, a plug-in supporting the HTML 5) of another APP.

The method in FIG. 3 is described using jumping from a current page to a historical page (e.g., a buffer page as described above) as an example. The method can also be used in conjunction with the method in FIG. 1. For example, after jumping to the target page, a user may want to jump to a historical page from the target page. In this scenario, the target page becomes the current page.

Corresponding to the embodiment of the method for jumping between pages and/or the method for returning from a page, this application further provides an embodiment of a device for jumping between pages and/or a device for returning from a page.

Figure 4:
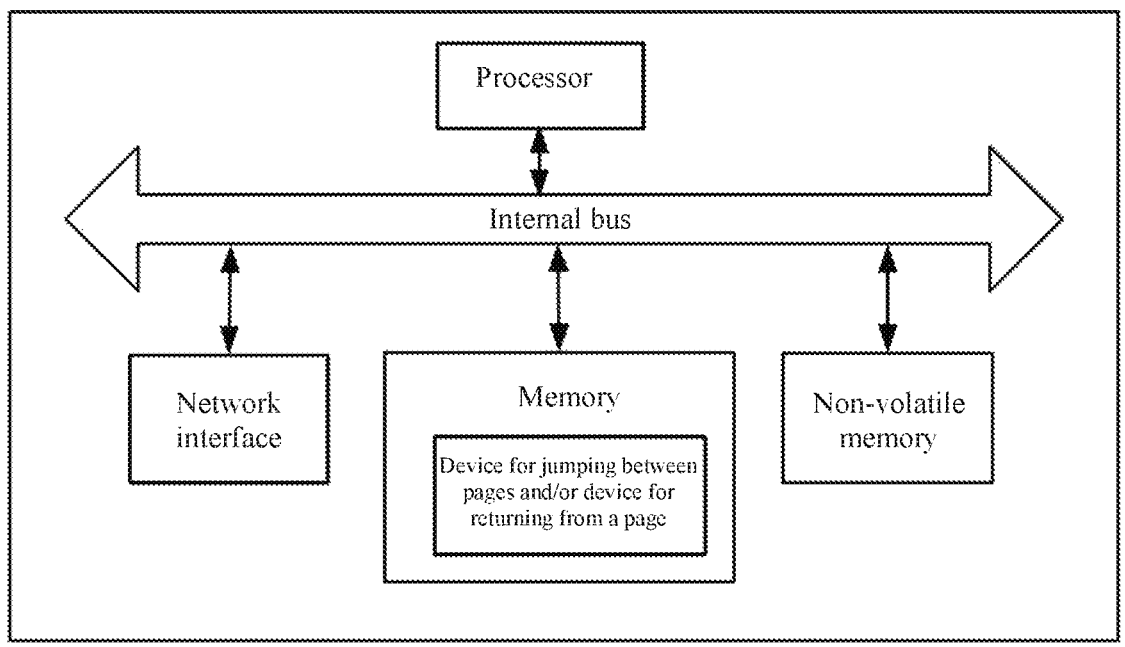
FIG. 4 is a schematic structural diagram of a device is in which a device for jumping between pages or a device for returning from a page is located according to an embodiment of this application.

The embodiment of the device for jumping between pages and/or device for returning from a page may be applied to a device. The device embodiment may be implemented by using software, or may be implemented by using hardware or a combination of software and hardware. Using software implementation as an example, a device, in a logical sense, is a structural diagram of software, performed by a computing device or equipment in which a processor of the computing device reads corresponding computer program instructions in a non-volatile memory to a memory of the computing device. In addition to a processor, a memory, a network interface, and a non-volatile memory that are shown in FIG. 4, usually, the computing device in which the device in this embodiment is located may further include one or more hardware based on an actual function of the computing device, and details are not described. As shown in FIG. 4, the memory can be a non-transitory computer-readable storage medium that stores instructions that, when executed by the processor, cause the processor to per form the method of jumping pages as described above.

Figure 5:
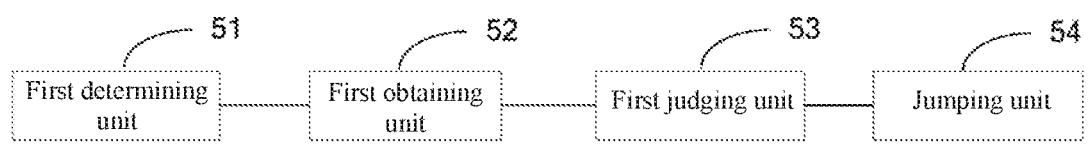
FIG. 5 is a schematic structural diagram of a device for jumping between pages according to an embodiment of this application.

FIG. 5 is a schematic structural diagram of a device for jumping between pages according to an embodiment of this application. An APP client is installed in the device, and the APP client is associated with tree path information. The device includes a first determining unit 51, a first obtaining unit 52, a first judging unit 53, and a jumping unit 54. The first determining unit 51 is configured to: when a jump from a current page to a target page is needed, determine a target jump path for jumping to the target page.

The first obtaining unit 52 is configured to obtain, based on the tree path information, valid jump paths for jumping from the current page.

The first judging unit 53 is configured to determine whether the target jump path exists in the valid jump paths. The jumping unit 54 is configured to: when the first judging unit determines that the target jump path exists in the valid jump paths, buffer page content of the current page to a top of a stack, and jump from the current page to the target page through the target jump path.

Optionally, in another embodiment, the first obtaining unit 52 is specifically configured to query the tree path information by using a bridged application interface (jsbridge api), to obtain the valid jump paths for jumping from the current page.

The tree path information includes different levels of pages and jump paths between the pages, and the pages include: a home page, a plurality of level-1 service pages, a plurality of level-2 service pages, . . . , and a plurality of level-N service pages, where N is a natural number and is the same as a quantity of levels of page buffer, a jump between the different levels of pages is performed through a path, and a jump between the home page and all other levels of pages is performed through a path. For a schematic diagram of a structure of the tree path information, refer to the foregoing descriptions. Details are not described herein again.

Optionally, in another embodiment, the device may further include a second obtaining unit, a third obtaining unit, a second judging unit, and a return unit (not shown).

The second obtaining unit is configured to: when a current page needs to return to a historical pages, determine a buffer page corresponding to content buffered in a top of a stack, and further determine a target return path for jumping to the buffer page.

The third obtaining unit is configured to obtain, based on the tree path information, valid return paths needed for return by the current page.

The second judging unit is configured to determine whether the target return path exists in the valid return paths.

The return unit is configured to return to the historical page through the target return path, and pop the buffer page from the stack.

For a specific process for implementing a function and an effect of each unit in the foregoing device, refer to a specific implementation process of a corresponding step in the foregoing method, and details are not described herein again.

Figure 6:
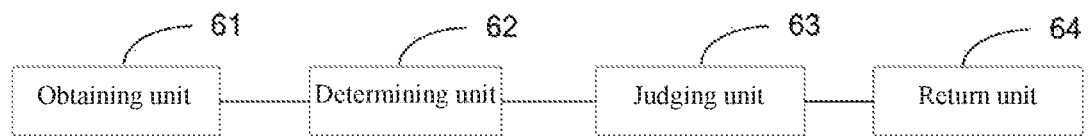
FIG. 6 is a schematic structural diagram of a device for returning from a page according to an embodiment of this application.

FIG. 6 is a schematic structural diagram of a device for returning from a page according to an embodiment of this application. An APP client is installed in the device, and the APP client is associated with tree path information. The device includes an obtaining unit 61, a determining unit 62, a judging unit 63, and a return unit 64.

The obtaining unit 61 is configured to: when a current page needs to return to historical pages, determine a buffer page corresponding to content buffered in a top of a stack, and further determine a target return path for jumping to the buffer page.

The determining unit 62 is configured to obtain valid return paths of the current page based on the tree path information.

The judging unit 63 is configured to determine whether the target return path exists in the valid return paths.

The return unit 64 is configured to: when the judging unit determines whether the target return path exists in the valid return paths, return to the historical page through the target return path, and pop the buffer page from the stack.

Optionally, in another embodiment, the obtaining unit 61 is specifically configured to query the tree path information by using a bridged application interface (jsbridge api), to obtain the valid return paths for jumping from the current page.

Refer to the foregoing descriptions for details of the tree path information, and details are not described herein again.

For a specific process for implementing a function and an effect of each unit in the foregoing device, refer to a specific implementation process of a corresponding step in the foregoing method, and details are not described herein again.

The solution in this application can be effectively applied to a browser or a browser plug-in (for example, a plug-in supporting HTML 5) of another APP. Layers and a sequence of opening HTML 5 pages are limited by planning a path for opening HTML 5 by using a webview, to enable the HTML 5 pages to jump forward and return backward in sequence. This resolves a problem that the APP collapses because excessive HTML 5 pages are opened.

That is, the pages are enabled to jump forward and return backward completely in sequence by controlling the sequence in which the pages are opened by using the webview. The jump between or the return from the pages no longer depends on a relatively random operation of a user. In addition, layers of a page stack are controlled, to resolve a problem that the stack includes excessive pages, thereby improving experience of using the HTML 5 plug-in by the user. After the user accesses an HTML 5 page of an active APP by using another APP, the user taps a return key, and returns to a page on which the user is desired to stay, thereby effectively increasing attention of the user on an active page.

Because the device embodiments basically correspond to the method embodiments, for the related parts, refer to the descriptions of the method embodiments. The device embodiments described above are merely schematic. Units described as separate parts may or may not be physically separate, and parts displayed as units may or may not be physical units, may be located in one position, or may be distributed on a plurality of network units. Some or all of the modules may be selected according to actual requirements to achieve the objectives of the solutions of this application. A person of ordinary skill in the art may understand and implement this application without creative efforts.

The foregoing descriptions are merely preferred embodiments of this application, but are not intended to limit this application. Any modification, equivalent replacement, and improvement made within the spirit and principle of this application shall fall within the protection scope of this application.

What is claimed is:

1. A method for jumping between pages, to be implemented by a mobile application (APP) on a computing device, the method comprising:
   determining a target jump path for jumping from a current page to a target page;
   obtaining, based on tree path information associated with the mobile APP and locally stored in the computing device, valid jump paths for jumping from the current page, wherein the tree path information comprises, for each of one or more pages, one or more forward paths and one or more backward paths;
   determining whether the valid jump paths that are obtained locally include the target jump path; and
   if the valid jump paths obtained locally include the target jump path, buffering page content of the current page to a top of a stack, and jumping from the current page to the target page through the target jump path;
   if the valid jump paths obtained locally do not include the target jump path, providing a notification comprising information about a jump error.

2. The method according to claim 1, wherein the obtaining, based on the tree path information, valid jump paths for jumping from the current page comprises:
   querying the tree path information by using a bridged application interface, to obtain the valid jump paths for jumping from the current page.

3. The method according to claim 2, wherein the tree path information comprises different levels of pages and jump paths between the pages, and the pages comprise: a home page, a plurality of level-1 service pages, a plurality of level-2 service pages, and a plurality of level-N service pages, wherein N is a natural number and is the same as a quantity of levels of page buffer.

4. The method according to claim 1, further comprising:

determining a buffer page corresponding to content buffered in a top of a stack, and further determining a target return path for jumping to the buffer page;

obtaining valid return paths of the target page based on the tree path information;

determining whether the target return path exists in the valid return paths; and if the target return path exists in the valid return paths, returning to the buffer page through the target return path.

5. The method according to claim 4, wherein the obtaining valid return paths of the target page based on the tree path information comprises:

querying the tree path information by using a bridged application interface, to obtain the valid return paths of the target page.

6. A method for returning from a page, to be implemented by a mobile application (APP) on a computing device, the method comprising:

determining a buffer page corresponding to content buffered in a top of a stack, and further determining a target return path for jumping to the buffer page;

obtaining valid return paths of a current page based on tree path information locally stored on the computing device, wherein the tree path information comprises, for each of one or more pages, one or more forward paths and one or more backward paths;

determining whether the target return path exists in the valid return paths that are obtained locally; and if the target return path exists in the valid return paths obtained locally, returning to the buffer page through the target return path;

if the target jump path does not exist in the valid return paths obtained locally, returning to a page corresponding to a valid return path.

7. The method according to claim 6, wherein the obtaining valid return paths of the current page based on the tree path information comprises:

querying the tree path information by using a bridged application interface, to obtain the valid return paths of the current page.

8. The method according to claim 7, wherein the tree path information comprises different levels of pages and jump paths between the pages, and the pages comprise: a home page, a plurality of level-1 service pages, a plurality of level-2 service pages, and a plurality of level-N service pages, wherein N is a natural number and is the same as a quantity of levels of page buffer.

9. A computing device comprising a processor and a non-transitory computer-readable storage medium storing instructions associated with a mobile application (APP) on the computing device, the instructions, when executed by the processor, causing the processor to perform operations comprising:

determining a target jump path for jumping from a current page to a target page;

obtaining, based on tree path information associated with the mobile APP and locally stored in the computing device, valid jump paths for jumping from the current page, wherein the tree path information comprises, for each of one or more pages, one or more forward paths and one or more backward paths;

determining whether the valid jump paths that are obtained locally include the target jump path; and if the valid jump paths obtained locally include the target jump path, buffering page content of the current page to a top of a stack, and jumping from the current page to the target page through the target jump path;

if the valid jump paths obtained locally do not include the target jump path, providing a notification comprising information about a jump error.

10. The computing device according to claim 9, wherein the obtaining, based on the tree path information, valid jump paths for jumping from the current page comprises:

querying the tree path information by using a bridged application interface, to obtain the valid jump paths for jumping from the current page.

11. The computing device according to claim 10, wherein the tree path information comprises different levels of pages and jump paths between the pages, and the pages comprise: a home page, a plurality of level-1 service pages, a plurality of level-2 service pages, and a plurality of level-N service pages, wherein N is a natural number and is the same as a quantity of levels of page buffer.

12. The computing device according to claim 9, wherein the operations further comprise:

determining a buffer page corresponding to content buffered in a top of a stack, and further determining a target return path for jumping to the buffer page;

obtaining valid return paths of the target page based on the tree path information;

determining whether the target return path exists in the valid return paths; and if the target return path exists in the valid return paths, returning to the buffer page through the target return path.

13. The computing device according to claim 9, wherein the obtaining valid return paths of the target page based on the tree path information comprises:

querying the tree path information by using a bridged application interface, to obtain the valid return paths of the target page.

* * * * *